US008843156B2

(12) United States Patent
Prince et al.

(10) Patent No.: US 8,843,156 B2
(45) Date of Patent: Sep. 23, 2014

(54) DISCOVERING AND PREVENTING A COMMUNICATIONS DISRUPTION IN A MOBILE ENVIRONMENT

(75) Inventors: Gregory B. Prince, Marlborough, MA (US); John P. Pehowich, Sudbury, MA (US); George M. Vachula, Harvard, MA (US)

(73) Assignee: Raytheon Company, Waltham, MA (US)

( * ) Notice: Subject to any disclaimer, the term of this patent is extended or adjusted under 35 U.S.C. 154(b) by 316 days.

(21) Appl. No.: 13/186,977

(22) Filed: Jul. 20, 2011

(65) Prior Publication Data

US 2012/0021694 A1 Jan. 26, 2012

Related U.S. Application Data

(60) Provisional application No. 61/366,332, filed on Jul. 21, 2010.

(51) Int. Cl.
*H04W 24/00* (2009.01)

(52) U.S. Cl.
USPC .......................... 455/456.1; 455/504; 455/505

(58) Field of Classification Search
CPC .......... H04B 17/0042; H04B 17/0075; H04W 52/367; H04W 4/02; H04W 4/021; H04W 4/028; H04W 24/08; H04W 40/18; H04W 40/12; H04W 28/04; H04W 24/00; H04W 76/04; H04W 88/06; H04L 67/18; H04L 12/5695; H04L 45/22; H04L 45/26; H04L 47/745; H04L 47/805; H04L 47/824; H04L 45/54; H04L 12/2602; H04L 43/00; H04L 45/00

USPC .................. 455/528, 68, 404.1, 426.1, 456.1, 455/414.2, 423, 466, 411, 444, 420, 404.2, 455/424, 187.1, 445, 453, 457, 415, 552.1, 455/422.1, 429, 427, 452.1; 370/321, 316, 370/319, 338, 328, 331, 329, 237, 252, 352, 370/310, 401, 315, 342, 463, 254, 502, 522, 370/356, 395.2

See application file for complete search history.

(56) References Cited

U.S. PATENT DOCUMENTS

| 5,075,694 | A | 12/1991 | Donnangelo et al. |
| 7,590,589 | B2 | 9/2009 | Hoffberg |
| 2006/0101005 | A1* | 5/2006 | Yang et al. .................. 707/3 |
| 2009/0023456 | A1* | 1/2009 | Seacat et al. ............ 455/456.1 |
| 2009/0047943 | A1* | 2/2009 | Araki ...................... 455/423 |
| 2009/0247137 | A1* | 10/2009 | Awad ....................... 455/418 |
| 2010/0027517 | A1* | 2/2010 | Bonta et al. .............. 370/338 |

OTHER PUBLICATIONS

Li et al., "Evaluation of the LDR Protocol in aj Hybrid Sensor Networks/MANET Architecture", IEEE Xplore, Mar. 4, 2009, pp. 161-166.

(Continued)

*Primary Examiner* — Golam Sorowar
(74) *Attorney, Agent, or Firm* — Daly, Crowley, Mofford & Durkee, LLP (57) ABSTRACT

In one aspect, a method to discover and prevent a communications disruption in a mobile environment includes receiving data at a mobile platform from a geographical database, determining if the mobile platform will be blocked by a blockage event from accessing a network in response to data extracted from the geographical database and avoiding the blockage event if the mobile platform will be blocked from accessing the network.

16 Claims, 5 Drawing Sheets

(56) References Cited

OTHER PUBLICATIONS

Schnaufer et al., "Position-Based Unicast Routing for City Scenarios", IEEE Xplore, Aug. 8, 2008, 8 pages.
Jiang, "An Enhanced Prediction-Based Link Availability Estimation for MANETs", IEEE Transactions on Communications, vol. 52, No. 2, Feb. 2004, pp. 183-186.
Lee et al., "Survey of Routing Protocols in Vehicular Ad Hoc Networks", Oct. 2009, 28 pages.
Capata et al., "A Geo-based Application for the Management of Mobile Actors during Crisis Situations", Proceedings of the 5$^{th}$ International ISCRAM Conference—Washington, DC, May 2008, pp. 219-229.
Bohannan et al., "QoS Enhancement and Performance Evaluation of Ad-hoc Routing Protocols for Rural Public Safety", ICC, 2009, 5 pages.
Maleki et al., "Lifetime Prediction Routing in Mobile Ad Hoc Networks", Dept. of EE-Systems, University of Southern California, Los Angeles, CA, 2003, 6 pages.
Huang et al., "Cross-Feature Analysis for Detecting Ad-Hoc Routing Anomalies", College of Computing, Georgia Institute of Technology, Sep. 20, 2002, 25 pages.
Agarwal et al., "Distributed Power Control in Ad-hoc Wireless Networks", PIMRC, 2001, 15 pages.
Tiwari et al., "Mobility Aware Routing for the Airborne Network Backbone", 2008 IEEE, 7 pages.

* cited by examiner

DISCOVERING AND PREVENTING A COMMUNICATIONS DISRUPTION IN A MOBILE ENVIRONMENT

RELATED APPLICATIONS

This patent application claims priority to Application Ser. No. 61/366,332, filed Jul. 21, 2010 entitled "REAL TIME DYNAMIC OUTAGE ANTICIPATION IN MOBILE ENVIRONMENTS" which is incorporated herein by reference in its entirety.

BACKGROUND

A communications device in a mobile environment may lose communications with a wireless network due to a blockage event. The blockage event may be caused by terrain. For example, a mountain may block the line of sight of a signal from the communications device thereby preventing or degrading the quality of access to the wireless network. The communications device may also lose connectivity or encounter degraded performance with the wireless network due to weather conditions; however, often times the design of a waveform incorporates power margin to accommodate for such performance degradations due to weather. For example, a waveform used by the communications device actually uses approximately an order of magnitude (e.g. 10 decibels) more power to connect to the wireless network than it minimally requires, thereby allowing communications to continue in a heavy rain storm.

SUMMARY

In one aspect, a method to discover and prevent a communications disruption in a mobile environment includes receiving data at a mobile platform from a geographical database, determining if the mobile platform will be blocked by a blockage event from accessing a network in response to data extracted from the geographical database and avoiding the blockage event if the mobile platform will be blocked from accessing the network.

In another aspect, an article includes a machine-readable medium that stores executable instructions to discover and prevent a communications disruption in a mobile environment. The instructions cause a machine to receive data at a mobile platform from a geographical database, determine if the mobile platform will be blocked by a blockage event from accessing a network in response to data extracted from the geographical database and avoid the blockage event if the mobile platform will be blocked from accessing the network.

In a further aspect, an apparatus to discover and prevent a communications disruption in a mobile environment includes circuitry to receive data at a mobile platform from a geographical database, determine if the mobile platform will be blocked by a blockage event from accessing a network in response to data extracted from the geographical database and avoid the blockage event if the mobile platform will be blocked from accessing the network.

DETAILED DESCRIPTION

Described herein is an approach that allows systems disposed on mobile platforms to anticipate blockage events that will disrupt communications and to take the necessary actions to prevent disruption of the communications. In one example, the techniques described herein may anticipate a blockage event so that both directional and omni-directional waveforms can be used to pre-compensate for the blockage event by performing a modem reconfiguration or by alternating a path of the mobile platform. In another example, weather databases may be used to optimize communication capacity based on the predicted weather. In some examples, the user is able to configure whether the techniques to discover and prevent blockage events and degraded performance occurs automatically or manually.

With mobile ad-hoc networks gaining more attention, managing the dynamics of its topology while optimizing throughput and delay has presented many challenges. For instance, incorporating directional waveforms in a mobile environment requires knowledge of topology dynamics. Thus, prediction of blockage or degraded performance events is crucial to maintaining connectivity and optimizing throughput.

The dynamics of a directional waveform have typically included ships and airborne platforms. Attempts to solve this problem on such platforms have been to monitor and track multiple beams at once; however, this approach provides a reactionary mechanism to overcome a blockage or degraded performance event rather than being an anticipatory mechanism. Contrary to the conventional fixed positional environment in which directional waveforms operate, introducing mobility and dynamic topology changes has a greater likelihood of creating a blockage between the platform and the payload.

Figure 1:
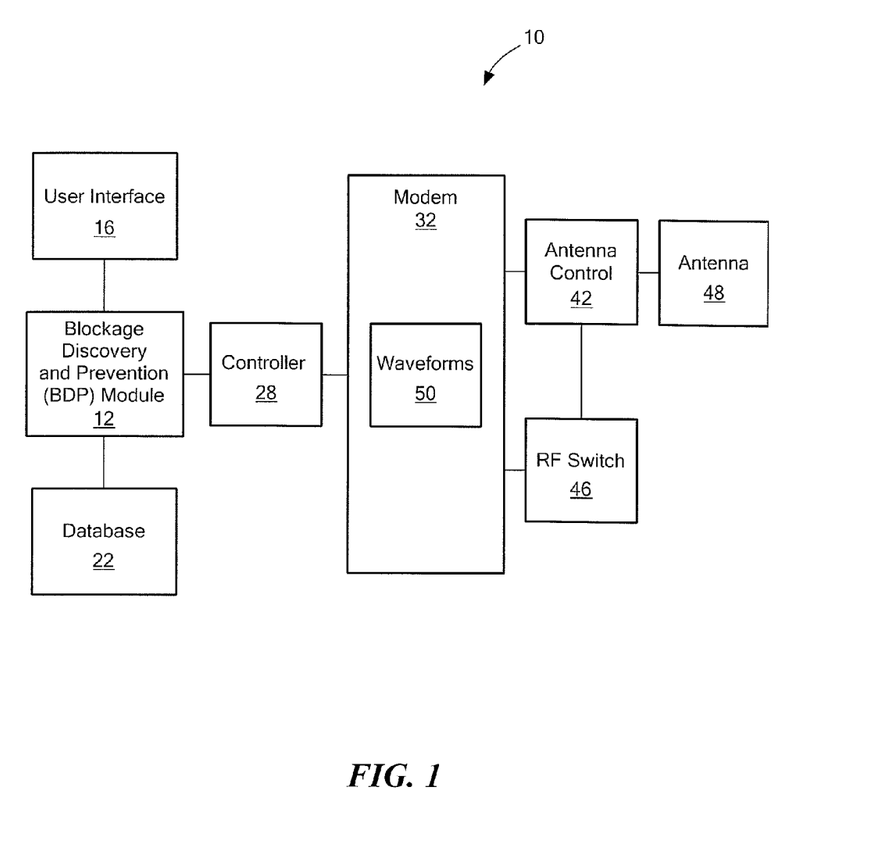
FIG. 1 is a system to discover and prevent a communications disruption in a mobile environment.

Referring to FIG. 1, an example of a system to discover and prevent blockage events is a system 10. System 10 includes a blockage discovery and prevention (BDP) module 12 coupled to a user interface (UI) 16, a database 22 and a controller 28. The system 10 also includes a modem 32 coupled to the controller 28, a radio frequency (RF) switch 46 and to an antenna control 42 that controls an antenna 48. In one example, the system 10 is disposed on a mobile platform (e.g., an airplane, a car, a truck, a tank, a train and so forth).

In one example, the system 10 is in communications with a mobile ad-hoc network (MANET) that includes a collection of mobile assets (e.g., sensors, radios and so forth) whose connectivity is maintained by means of dynamic routing while lacking any central infrastructure. A MANET's performance in terms of delay and throughput are topology dependent.

The BDP module 12 receives spatial data from the database 22 to determine if the system 10 will enter a location where a blockage event would occur. If the BDP module 12 determines that a blockage event will occur, the BDP 12 will enable the controller 28 to modify the modem 32 to avoid the blockage event. For example, a waveform presently used will be switched to another of the waveforms 50; power of the transmitted signal is increased, the data rate is increased; the modulation and/or coding is adapted; the antenna 48 is redirected; beams are switched; a transition to other satellites, airborne payloads and so forth occurs or any combination thereof.

The BDP module 12 also may use the weather data to determine whether the system 10 will be in a performance degrading environment or not. For example, many waveforms incorporate a weather margin (also known as a link margin) to maintain link closure during precipitation events. This weather margin can be viewed as wasted resources during clear sky conditions. Thus, anticipating that there will be no precipitation, for example, is a means to increase channel capacity.

In one example, the database 22 is an open source database (e.g., POSTGRES, POSTGIS) of spatial information (terrain, structures, foliage and so forth). In other examples, the database 22 may include databases (e.g., weather) which can facilitate in overcoming environmental constraints on communication performance.

In one example, the user interface 16 includes at least one of a keyboard, mouse, a display, a touch screen. In one particular example, the user interface 16 renders three-dimensional (3D) spatial terrain data accompanied with Doppler weather overlays to the user.

The modem 32 stores waveforms 50 that are used in communications (e.g., a multi-waveform programmable small form factor modem). A waveform 50 is defined as the collection of signal processing functions and attributes pertaining to a carrier signal, which can include frequency, modulation, coding, multiple access schema, bandwidth utilization, and power consumption and so forth. Examples of waveforms include but are not limited to commercial cellular networks (e.g., 3G and 4G-LTE), and military waveforms (e.g., Military Strategic and Tactical Relay (Milstar), Advanced Extremely High Frequency (AEHF), and Common Data Link (CDL)). Waveforms may also differ by constellation/payload, but could share some similarities. The waveforms 50 include, for example, constellation data (i.e., azimuth and elevation data). In one example, the waveforms are directional waveforms for use with a directional antenna.

The ability to use multiple waveforms (e.g., SATCOM waveforms) and satellites, airborne payloads and so forth provides many routing and bandwidth options. This is particularly important in an environment with many different types of blockage events as well as potential threats (e.g., jamming, weather events and so forth). In one example, the modem 32 runs a single waveform at a time but can be reconfigured to run another waveform. In another example, the modem 32 runs multiple waveforms simultaneously.

Figure 2:
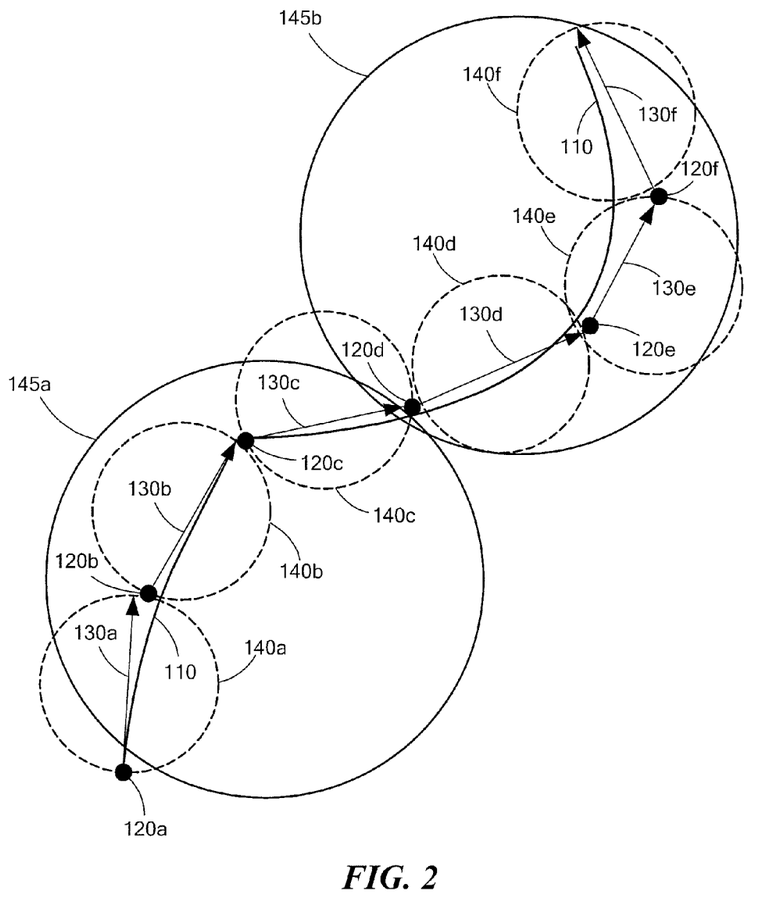
FIG. 2 is a diagram of an example of an outage determination along an arbitrary path.

To illustrate some of the benefits of anticipating outage events, consider an arbitrary path 110 of a system 10 on a mobile platform in FIG. 2. Along the path 110, at a determined sampling rate, T, the system 10 projects a velocity vector and considers relevant spatial terrain map (e.g., see FIG. 3) over a particular blockage volume, V. For example, at a first position 120a, the system 10 generates a velocity vector 130a with the blockage volume 140a; at a second position 120b, the system 10 generates a velocity vector 130b with the blockage volume 140b; at a third position 120c, the system 10 generates a velocity vector 130c with the blockage volume 140c; at a fourth position 120d, the system 10 generates a velocity vector 130d with the blockage volume 140d; at a fifth position 120e, the system 10 generates a velocity vector 130e with the blockage volume 140e; and at a sixth position 120f, the system 10 generates a velocity vector 130f with the blockage volume 140f. In other examples, a weather volume (e.g., a weather volume 145a and a weather volume 145b) is used to determine, for example, whether weather precipitation will occur so that the weather margin may be adjusted as shown in FIG. 4.

The spatial terrain map candidate is used to determine structure locations and anticipate line-of-sight (LOS) blockage events from these structures. Depending upon the terrain environment the volume and frequency of these spatial candidates can vary drastically. Urban environments will typically require frequent sampling of the environment due to structure density, whereas a flat, open desert may require only a few samples and never encounter a blockage candidate.

Figure 3:
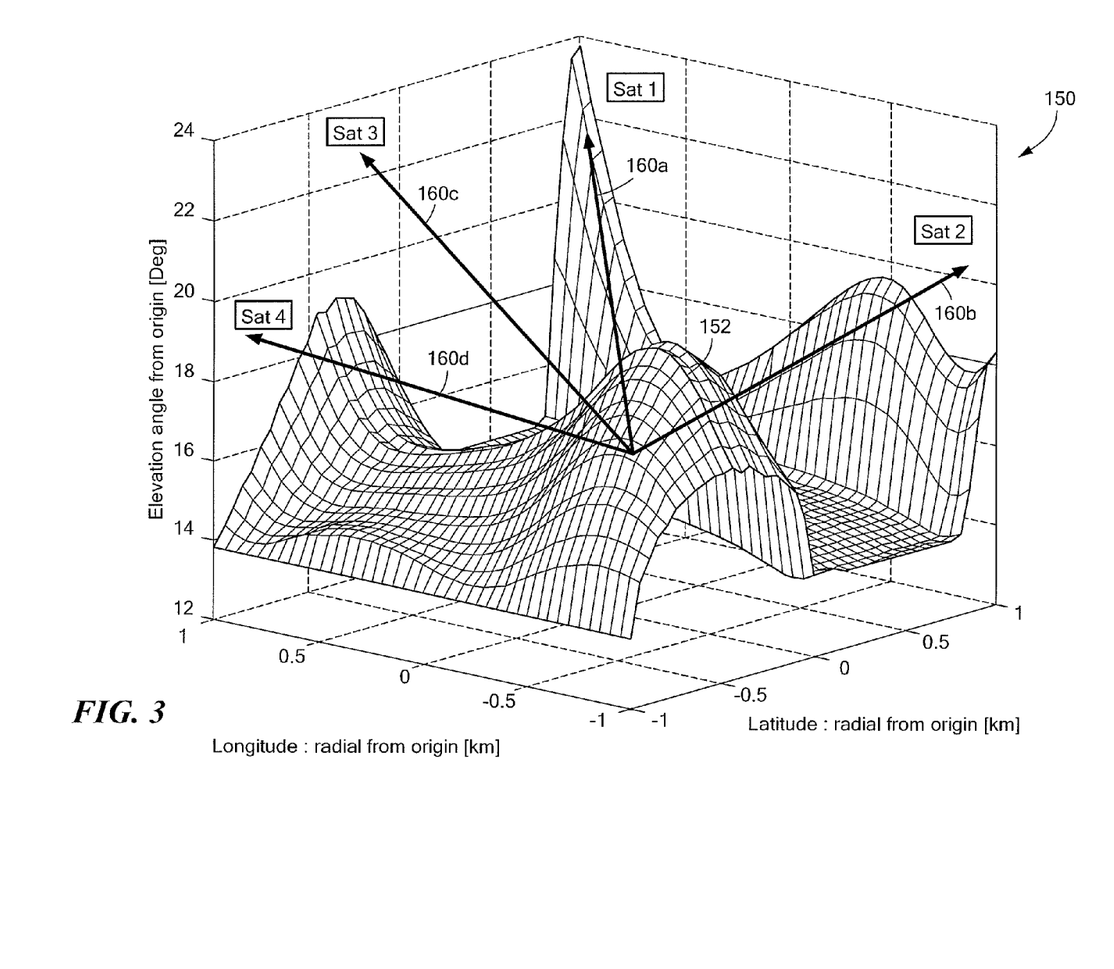
FIG. 3 is a diagram of an example of a terrain map used to determine blockages.
Figure 4:
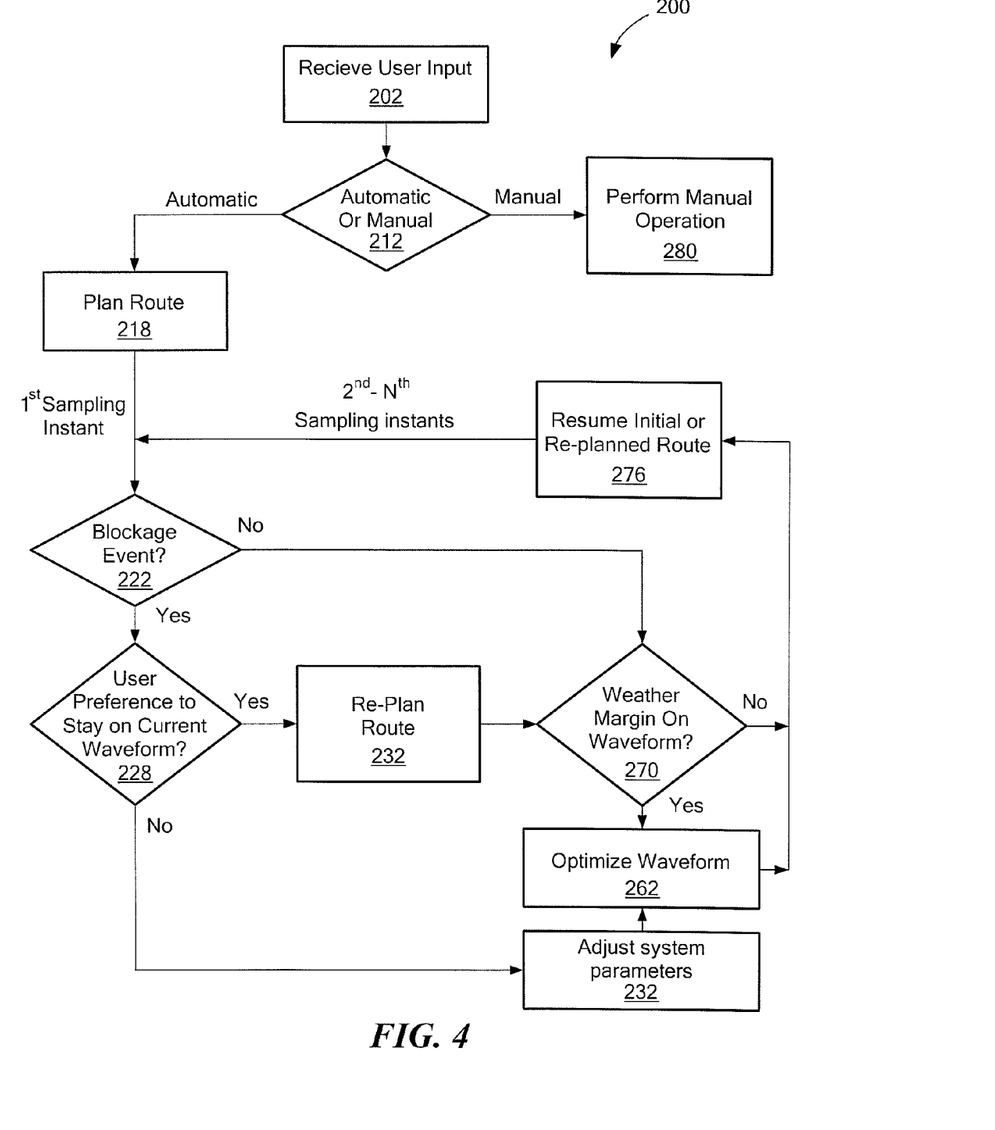
FIG. 4 is a flowchart of an example of a process to discover and prevent a communications disruption in a mobile environment.

FIG. 3 depicts a notional terrain candidate under clear skies for the system 10 with the modem 32, which has four waveforms loaded. A high level description of the process is that the system 10 predicts what it expects to observe based on the best available information at the prediction time and corrects its actions accordingly (for example, using a process 200 (FIG. 4), when real-time data becomes available to reinforce or correct predictions.

At a more detailed level, the operation may be interpreted as outlined herein. At a specific scan instant kT at a point P along the mobile platform's route, the BDP 12 requests certain spatial terrain information from the database 22 based on current estimates of position and time. A spatial terrain map 150 of a terrain 152 is located around a given blockage volume V of the best estimate of current location of the system 10. System 10 projects vectors from its own current position (as well as future positions within the blockage volume V based on velocity estimates) to the position of each payload (e.g., a satellite, air borne platform, and so forth) corresponding to a waveform. For example, a projected vector 160a of a first waveform is associated with a first satellite (SAT1), a projected vector 160b of a second waveform is associated with a second satellite (SAT2), a projected vector 160c of a third waveform is associated with a third satellite (SAT3) and a projected vector 160d of a fourth waveform is associated with a fourth satellite (SAT4). The constellation ephemeris, which contains the position and motion rates of the payload, for each waveform is local to the system 10 to enable such processing.

Once the vector projections are performed, blockage candidates along the map 150 can be determined. If an active waveform is a candidate for blockage, the application is envisioned to provide recommendation of either an alternate route or an alternate waveform. This example illustrates that satellites, SAT1, SAT2 and SAT4 are subject to a blockage event for the shown vector projection. If the system 10 happened to be communicating on SAT3, a blockage event will not occur and the user can continue along the route. However, if the active waveform is one of the other three satellites (SAT1, SAT2 and SAT4), an alternate candidate waveform or route will be displayed to the user. In one example, the preference of the user interaction can be predetermined before being deployed.

Referring to FIG. 4, an example of a process to discover and prevent blockage events is a process 200. Process 200 receives user input (202). For example, a user using the user interface 16 to indicate whether the remaining process blocks will be automatically performed or manually performed. This determines if the decision point is to be executed automatically by the system or to await user confirmation of the system's desired actions. In another example, the user using the user interface 16 provides geographic route parameters of a rigid route to be taken e.g., an example of a route option from a consumer GPS would be "no toll roads may be used." In another example, a user may require maintaining connectivity on a particular waveform and allowing the user interface to direct the user on a new geographic route.

Process 200 determines if the user selected an automatic or manual operation (212). If the user indicates an automatic operation, then the processing blocks 212-276 are performed automatically (i.e., without user intervention).

Process 200 plans a route (218). For example, the process 200 uses a known aerial layer flight plan of the aerial layer platform it desires to communicate with and, the process 200 plans a route for the mobile platform (with the system 10) to travel. In another example, process 200, using a satellite table, determines a route for data communications to travel (e.g., which satellites to access). In other examples, GPS data, POST-GIS terrain Maps and weather databases are used to determine a route.

Process 200 determines, after the first sampling instant, if there will be a blockage event along the route determined in processing block 218 (222). For example, navigation aids (e.g., GPS) are used for determining best routes based on current positional information. In one particular example, since GPS uses map structures, position, timing, and velocity estimates to provide real time feedback to users (drivers) to facilitate navigation, GPS is expanded from the two-dimensional (2D) map concept to incorporate three-dimensional (3-D) spatial terrain system 10 that can anticipate blockage events.

If there will be a blockage event along the route, process 200 determines if the user has indicated to continue using the current waveform (228) and if so, the geographic route is altered to service this user desired constraint. For example, the user pre-stores an indicator of what the user's preference when process 200 executes processing block 228.

If the user indicates not to use the current waveform or its current parameters, process 200 adjusts the system parameters (232). In one example, the controller 28 changes the waveform on the modem 32. In another example, the controller 28 increases at least one of the following, a transmit power and a data rate generated by the modem 32. In a further example, optimization of waveform parameters such as modulation or coding or both are changed at the modem 32. In still further examples, the controller 28 switches constellations/payloads. In other examples, the controller 28 executes any combination of changes at the modem 32 previously mentioned.

Process 200 determines if there is a weather margin on the waveform (270). If there is a weather margin on the waveform, process 200 optimizes the waveform (262). For example, if there is not going to be any precipitation then we can use the transmit power weather margin to increase channel capacity. The modem 32 uses this information to optimize waveform parameters such as transmit power to effectively increase the achievable data rate under the current weather environment.

If the user has indicated to use the current waveform, the route is re-planned (232). For example, the route of the mobile platform is rerouted to avoid the blockage event. In another example, the data path is rerouted to avoid the blockage event.

Process 200 determines if there is a weather margin on the waveform (270). If there is a weather margin on the waveform, process 200 optimizes the waveform (262) by performing processing block 262.

After performing processing block 262, the process 200 resumes initial or re-planned route depending on the result of processing block 228 (276). Process 200 returns to processing block 222 for subsequent sampling instants.

If the user selects a manual process at processing block 212, the process 200 performs a manual operation that includes the same processing blocks (processing blocks 218 to 276) as an automatic processing except at the processing block 228 the user enters their desire at that time (e.g., using the user interface 16) unlike the automatic operation where the user's pre-stored desire is used.

Figure 5:
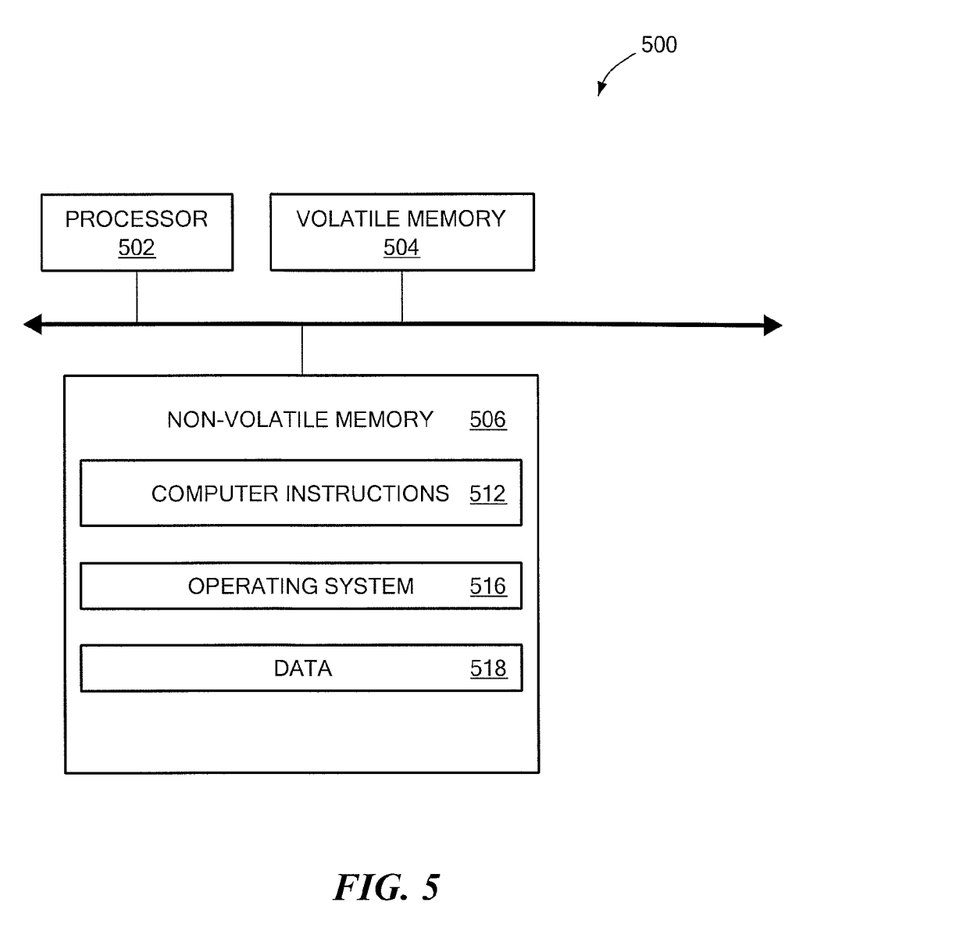
FIG. 5 is a block diagram of an example of a computer to perform the process of FIG. 4.

Referring to FIG. 5, an example of an implementation of the BDP module 12 is a computer 500. The computer 500 includes a processor 502, a volatile memory 504 and a non-volatile memory 506 (e.g., a hard disk). The non-volatile memory 506 stores computer instructions 512, an operating system 516 and data 518. In one example, the computer instructions 518 are executed by the processor 502 out of volatile memory 504 to perform all or part of the process 200. In other examples, the computer 500 may represent additional elements of system 10 in FIG. 1. For example, the computer 500 may represent both the BDP module 12 and the controller 28.

The processes described herein (e.g., the process 200) are not limited to use with the hardware and software configuration shown in FIG. 5; they may find applicability in any computing or processing environment and with any type of machine or set of machines that are capable of running a computer program. The processes described herein may be implemented in hardware, software, or a combination of the two. The processes described herein may be implemented as a set or subset of services in computer programs executed on programmable computers/machines that each includes a processor, a storage medium or other article of manufacture that is readable by the processor (including volatile and non-volatile memory and/or storage elements), at least one input device, one or more output devices, and a network connection. Program code may be applied to data entered using an input device to perform the processes described herein and to generate output information.

The system may be implemented, at least in part, via a computer program product, (e.g., in a machine-readable storage device), for execution by, or to control the operation of, data processing apparatus (e.g., a programmable processor, a computer or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific embodiments described. For example, the process 200 is not limited to the specific processing order of FIG. 4. Rather, any of the processing blocks of FIG. 4 may be re-ordered, combined or removed, performed in parallel or in serial, as necessary, to achieve the results set forth above.

The processing blocks in FIG. 4 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

The processes described herein are not limited to the specific embodiments described. Elements of different embodiments described herein may be combined to form other embodiments not specifically set forth above. Other embodiments not specifically described herein are also within the scope of the following claims.

What is claimed is:

1. A method to discover and prevent a communications disruption in a mobile environment comprising:
receiving data at a mobile platform from a geographical database, wherein the data from the geographical database comprising at least one of terrain, structures and foliage;
receiving data, at the mobile platform, from a weather database, wherein the data from the weather database comprising precipitation data;
determining at the mobile platform if the mobile platform will be blocked by a blockage event from accessing a network in response to the data extracted from the geographical database;
determining at the mobile platform if the mobile platform will be in an environment of precipitation in response to the precipitation data from the weather database; and
avoiding the blockage event if it is determined that the mobile platform will be blocked from accessing the network based on the data extracted from the geographical database and the precipitation data from the weather database,
wherein avoiding the blockage event comprises changing at least one of:
a route of the mobile platform; or
a communications path if a preference of a user is to continue using a current waveform at a modem; or
system parameters of a modem if a preference of a user is to discontinue using a current waveform on a modem; or
a current waveform on a modem to use more channel capacity if it is determined in response to the precipitation data that the mobile platform will not be in the environment of precipitation.

2. The method of claim 1 wherein avoiding the blockage event comprises changing one of a route of the mobile platform or a communications path if a preference of a user is to continuing using a current waveform at a modem.

3. The method of claim 1 wherein avoiding the blockage event comprises changing system parameters of a modem if a preference of a user is to discontinue using a current waveform at a modem.

4. The method of claim 3 wherein changing the system parameters comprises at least one of:
changing a waveform on the modem;
increasing a transmit power of the modem;
increasing a data generated by the modem;
changing modulation at the modem; and
changing coding at the modem.

5. The method of claim 1 wherein receiving data at the mobile platform from the geographical database comprises receiving data at the mobile platform from an open source database.

6. An article, comprising:
a non-transitory machine-readable medium that stores executable instructions to discover and prevent a communications disruption in a mobile environment, the instructions causing a machine to:
receive data at a mobile platform from a geographical database, wherein the data from the geographical database comprising at least one of terrain, structures and foliage;
receive data, at the mobile platform, from a weather database, wherein the data from the weather database comprising precipitation data;
determine at the mobile platform if the mobile platform will be blocked by a blockage event from accessing a network in response to the data extracted from the geographical database;
determine at the mobile platform if the mobile platform will be in an environment of precipitation in response to the precipitation data from the weather database; and
avoid the blockage event if it is determined that the mobile platform will be blocked from accessing the network based on the data extracted from the geographical database and the precipitation data from the weather database, wherein the instructions causing the machine to avoid the blockage event comprises the instructions causing the machine to change at least one of:
a route of the mobile platform; or
a communications path if a preference of a user is to continue using a current waveform at a modem; or
system parameters of a modem if a preference of a user is to discontinue using a current waveform on a modem; or
a current waveform on a modem to use more channel capacity if it is determined in response to the precipitation data that the mobile platform will not be in the environment of precipitation.

7. The article of claim 6 wherein the instructions causing the machine to avoid the blockage event comprises instructions causing the machine to change one of a route of the mobile platform or a communications path if a preference of a user is to continuing using a current waveform at a modem.

8. The article of claim 6 wherein the instructions causing the machine to avoid the blockage event comprises instructions causing the machine to change system parameters of a modem if a preference of a user is to discontinue using a current waveform at a modem.

9. The article of claim 8 wherein the instructions causing the machine to change the system parameters comprises at least one of instructions causing the machine to:
change a waveform on the modem;
increase a transmit power of the modem;
increase a data generated by the modem;
change modulation at the modem; and
change coding at the modem.

10. The article of claim 6 wherein the instructions causing the machine to receive data at the mobile platform from the geographical database comprises instructions causing the machine to receive data at the mobile platform from an open source database.

11. An apparatus to discover and prevent a communications disruption in a mobile environment, comprising:

hardware circuitry to:
  receive data at a mobile platform from a geographical database, wherein the data from the geographical database comprising at least one of terrain, structures and foliage;
  receive data, at the mobile platform, from a weather database, wherein the data from the weather database comprising precipitation data;
  determine at the mobile platform if the mobile platform will be blocked by a blockage event from accessing a network in response to the data extracted from the geographical database;
  determine at the mobile platform if the mobile platform will be in an environment of precipitation in response to the precipitation data from the weather database; and
  avoid the blockage event if it is determined that the mobile platform will be blocked from accessing the network based on the data extracted from the geographical database and the precipitation data from the weather database, wherein the hardware circuitry to avoid the blockage event comprises hardware circuitry to change at least one of:
    a route of the mobile platform; or
    a communications path if a preference of a user is to continue using a current waveform at a modem; or
    system parameters of a modem if a preference of a user is to discontinue using a current on the modem; or
    a current waveform on a modem to use more channel capacity if it is determined in response to the precipitation data that the mobile platform will not be in the environment of precipitation.

12. The apparatus of claim 11 wherein the hardware circuitry comprises at least one of a processor, a memory, programmable logic and logic gates.

13. The apparatus of claim 11 wherein the hardware circuitry to avoid the blockage event comprises circuitry to change one of a route of the mobile platform or a communications path if a preference of a user is to continuing using a current waveform at a modem.

14. The apparatus of claim 11 wherein the hardware circuitry to avoid the blockage event comprises circuitry to change system parameters of a modem if a preference of a user is to discontinue using a current waveform at a modem.

15. The apparatus of claim 14 wherein the hardware circuitry to change the system parameters comprises at least one of circuitry to:
  change a waveform on the modem;
  increase a transmit power of the modem;
  increase a data generated by the modem;
  change modulation at the modem; and
  change coding at the modem.

16. The apparatus of claim 11 wherein the hardware circuitry to receive data at the mobile platform from the geographical database comprises circuitry to receive data at a mobile platform from an open source database.

* * * * *